(12) United States Patent
Hoelzlwimmer et al.

(10) Patent No.: US 10,378,881 B2
(45) Date of Patent: Aug. 13, 2019

(54) DISTANCE MEASURING DEVICE

(71) Applicant: Robert Bosch GmbH, Stuttgart (DE)

(72) Inventors: Stephanie Hoelzlwimmer, Leinfelden (DE); Irene Zamorano-Calderon, Stuttgart (DE); Stefanie Prager, Leinfelden (DE); Nicolas Gros, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 794 days.

(21) Appl. No.: 14/774,814

(22) PCT Filed: Mar. 11, 2014

(86) PCT No.: PCT/EP2014/054714
§ 371 (c)(1),
(2) Date: Sep. 11, 2015

(87) PCT Pub. No.: WO2014/140020
PCT Pub. Date: Sep. 18, 2014

(65) Prior Publication Data
US 2016/0025482 A1 Jan. 28, 2016

(30) Foreign Application Priority Data
Mar. 13, 2013 (DE) ........................ 10 2013 004 266

(51) Int. Cl.
*G01C 3/08* (2006.01)
*G01B 11/14* (2006.01)
(Continued)

(52) U.S. Cl.
CPC ............ *G01B 11/14* (2013.01); *G01C 15/002* (2013.01); *G01S 17/08* (2013.01)

(58) Field of Classification Search
CPC ........ G01B 11/14; G01C 15/002; G01S 17/08
See application file for complete search history.

(56) References Cited

U.S. PATENT DOCUMENTS 5,806,020 A 9/1998 Zykan
8,111,383 B1 2/2012 Foley
(Continued)

FOREIGN PATENT DOCUMENTS

CN 101308410 A 11/2008
CN 202587310 U 12/2012
(Continued)

OTHER PUBLICATIONS

Digital Laser Distance Meter, LM50, Devon, (Chinese, p. 1-8; English, pp. 8-17), retrieved from http://devon.com.cn/upload/products/20110926/20110926013724.pdf on Feb. 28, 2017.
(Continued)

*Primary Examiner* — Samantha K Abraham
(74) *Attorney, Agent, or Firm* — Maginot, Moore & Beck LLP

(57) ABSTRACT

A distance measuring device, in particular a hand-held laser distance meter, includes a housing, transmission unit, receiving unit, and first operating unit. The first operating unit is arranged on the housing and configured to trigger at least one distance measurement, and includes a disk element. The transmission unit is arranged in the housing and is configured to transmit a measuring radiation in a direction of an object to be measured. The receiving unit is configured to receive measuring radiation returning from the object. A method for operating the distance measuring device includes starting at least one first distance measurement by moving the first operating element from a first a second position at which the device is deactivated to a first position, in particular along a measurement axis, to trigger the measurement, or in particular a sequence of continuous distance measurements.

12 Claims, 4 Drawing Sheets

(51) Int. Cl.
      *G01C 15/00*      (2006.01)
      *G01S 17/08*      (2006.01)

(56) References Cited

U.S. PATENT DOCUMENTS

| | | |
|---|---|---|
| 2004/0060376 A1 | 4/2004 | Munro |
| 2009/0079954 A1 | 3/2009 | Smith et al. |
| 2010/0124900 A1* | 5/2010 | Lui .................. H04M 1/72541 455/404.2 |
| 2012/0236290 A1* | 9/2012 | Eisele .................. G01C 15/002 356/6 |
| 2013/0077081 A1 | 3/2013 | Lin |

FOREIGN PATENT DOCUMENTS

| | | |
|---|---|---|
| CN | 103163528 A | 6/2013 |
| CN | 103557835 A | 2/2014 |
| DE | 198 48 628 A1 | 4/2000 |
| DE | 101 04 877 A1 | 8/2002 |
| DE | 10 2008 037 486 A1 | 4/2010 |
| DE | 10 2009 029 372 A1 | 3/2011 |
| DE | 20 2010 017 059 U1 | 4/2011 |
| EP | 1 422 535 A1 | 5/2004 |

OTHER PUBLICATIONS

International Search Report corresponding to PCT Application No. PCT/EP2014/054714, dated May 23, 2014 (German and English language document) (7 pages).
Robert Bosch Gmbh; Easy to operate even for first-time users: The cross line laser Quigo from Bosch; Press Release; Sep. 24, 2010; 3 Pages; www.bosch-presse.de/presseforum/pressdownload/text/PI7173.pdf?id-4836,2.

* cited by examiner

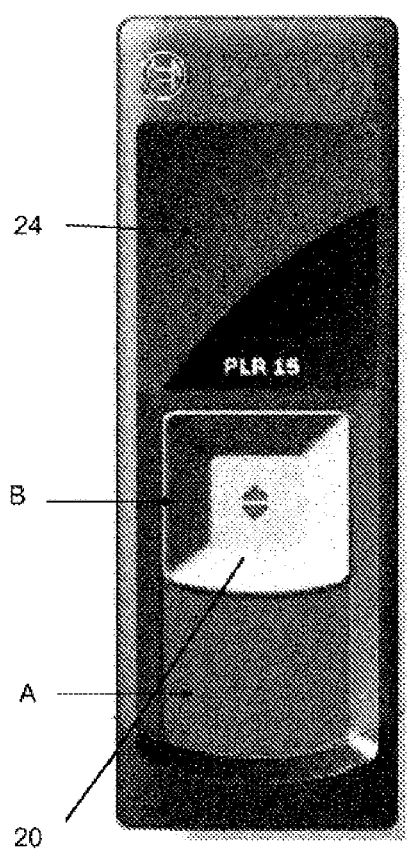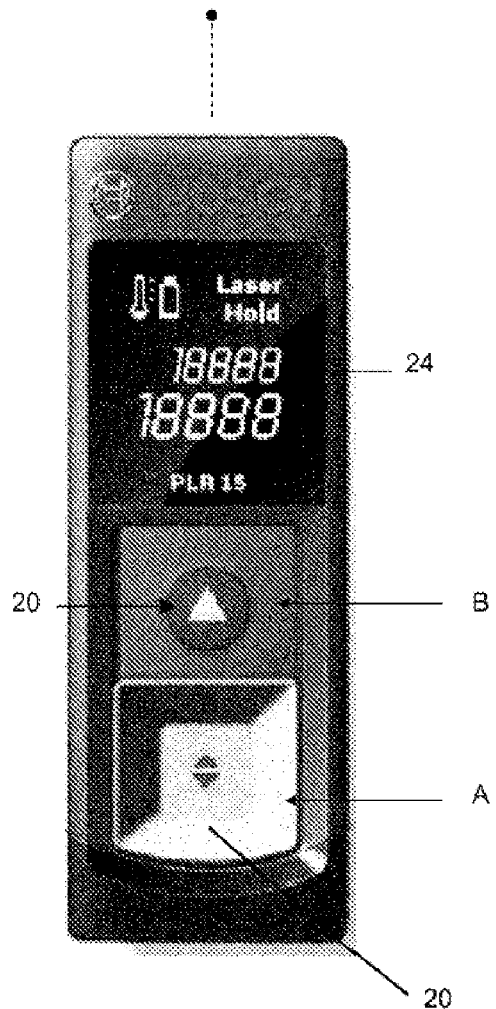
Fig. 4a    Fig. 4.b

DISTANCE MEASURING DEVICE

This application is a 35 U.S.C. § 371 National Stage Application of PCT/EP2014/054714, filed on Mar. 11, 2014, which claims the benefit of priority to Serial No. DE 10 2013 004 266.6, filed on Mar. 13, 2013 in Germany, the disclosures of which are incorporated herein by reference in their entirety.

BACKGROUND

The present disclosure relates to a distance measuring device, in particular an electro-optical distance meter, for example a laser distance meter, for determining length, and to a method for operating such a distance measuring device.

Electro-optical distance meters such as, for example, laser distance meters, are currently used in order to determine distances between two points simply, quickly and accurately. It is then also possible to carry out calculations relating to areas and volumes from said measured values and further data such as, for example, the angle between two measurement directions. The control of the device is performed as a rule via a keyboard provided on the device itself. The measurement result—length, area or volumes—is typically visualized on a display of the device which serves as a display unit.

DE 198 48 628 A1 discloses a method and an apparatus for measuring areas and volumes which is based on aiming and applying a laser beam from a central location in the space to be measured to all the points in three and two dimensions that are to be acquired. Using the distance and the associated angles from the respectively reflected laser beam, the 3D values of the vertices are determined and a drawing that is true to scale is made. The apparatus disclosed in DE 198 48 628 A1 comprises a laser distance meter consisting of a laser transmitter and a laser receiver which is mounted on a stand via a tilting and rotating device for alignment and angular measurement. Furthermore, the apparatus of DE 198 48 628 A1 comprises a telescopic sight and an electronic evaluation unit for acquiring and transmitting angle data and distance data, and a computer connected thereto.

The method disclosed in DE 198 48 628 A1 is quite complicated and requires lengthy training of the operator since, inter alia, each measurement requires prior determination of a reference coordinate system. Furthermore, the method presented requires an additional external computer which additionally has a negative influence on the cost and the ease of use of said measuring system.

DE 10 104 877 A1 discloses a device and method for measuring length, area or volume by means of a distance measuring device. For this purpose, said measuring device has a transmitting unit and a receiving unit in a housing, a keypad for operating the measuring device and an integrated calculator for evaluating measured data. The device of DE 10 104 877 A1 further has a display panel in the form of a display for displaying the measurement results.

In the case of the device of DE 10 104 877 A1, after preselection of a desired measurement mode (distance, area, volume), which is undertaken, in particular, by actuating only one key of the keypad of the device, the display panel of the measuring device uses symbolic graphics to display which individual measurements required to determine the desired measured variable are yet to be carried out.

It is the object of the present disclosure to provide a method and a device for length measurement which provide accurate measurement results and in so doing are simple and intuitive to understand for the user and safe to operate.

This object is achieved according to the disclosure by the features of the independent claims. Advantageous embodiments and developments of the disclosure are given with the features of the dependent claims.

SUMMARY

The distance meter according to the disclosure, which is designed as an electro-optical distance meter, in particular as a laser distance meter, in particular as a hand-held laser distance meter, has a housing and a transmitting unit, arranged in the housing, for emitting a measurement signal in the direction of a measurement object, and also has a receiving unit for receiving measuring radiation returning from the measurement object. In addition, the device has a computing and/or evaluation unit for determining measured distance data and/or for determining measured variables derived from the measured distance data. In addition, the distance meter according to the disclosure has a first operating element for triggering at least one distance measurement, said first operating element being designed as a type of slide element.

Virtually without exception, previously known, hand-held distance meters have an operating panel in the form of a keypad with a plurality of keys for actuating the device. Such a keypad enlarges the device, as well as the complexity of the device, and induces uncertainties and measuring errors in the case of an unpracticed user. Moreover, experience has shown that numerous users are put off from buying and/or using an electro-optical distance meter once it has been purchased because of the multiplicity of keys and functions. Owners of hand-held electro-optical distance meters frequently make use of only a few main functions of the device such as, for example, length measurement, continuous measurement or the addition of routes. More complex measurement methods which likewise enable such a device, for example indirect height measurement, tracing functions or the like are comparatively seldom used.

In the case of the device according to the disclosure, the measurement is started by a single operating element. Said operating element is designed as a type of slide element for the sake of being simple to operate.

Reducing the number of operating elements of the electro-optical distance measuring device enables said operating elements to be larger and user friendly than would be the case for a device with a keypad.

This facilitates a small, compact device whose operating elements are, however, still sufficiently large to be operated easily and conveniently.

Moreover, the disclosure is based on the finding that it is possible with the aid of the operating element designed as a slide switch to implement a plurality of functions in a simple way without, for example, this necessitating multiple use of the operating element, as is typically the case with the keys of a keypad for example.

In the passive state of the distance measuring device, that is to say in the state in which the device is not switched on, the first operating element, designed as a slide switch, of the distance meter according to the disclosure also serves simultaneously to protect and seal a second operating element.

The first operating element for triggering a distance measurement is advantageously designed to be capable of sliding on or in the housing of the distance measuring device according to the disclosure.

In this case, the operating element can be arranged on the housing slideably substantially in the direction of the measurement signal. The operating element can be slid in this case in the direction of the measurement object, or away from the measurement object, preferably parallel to the measurement direction. Here, in the direction of the measurement signal means along the axis of measurement, but in the two directions, both toward the target and away from the target. This enables a user to stay in visual contact with the target and, at the same time, to actuate the operating element designed as a slide switch.

In particular, the operating element can be slid parallel to the longitudinal edges of the housing of the measuring device in order to trigger a distance measurement.

For this purpose, the housing of the distance measuring device has guide elements which enable the first operating element to be arranged slideably on the housing of the measuring device.

In particular, the first operating element slides in a plane, that is to say without a vertical offset, in particular.

Thus, the operating element according to the disclosure of the distance meter can start at least one distance measurement in a first position, in particular a first slide position. Thus, for example, in order to start a distance measurement to switch on the measurement beam, for example a laser beam serving for distance measurement, by "pulling down" the operating element designed as a slide, that is to say to slide the operating element away from the target object, typically away toward a user holding the measuring device in his hand. The measurement signal is evaluated by an appropriate arithmetic logic unit so that the measurement result can, for example, also be displayed on a display.

In an advantageous embodiment of the distance measuring device according to the disclosure, the operating element can also starts a continuous sequence of distance measurements, that is to say a continuous distance measurement in a first position, in particular in a first slide position. The measurement result is evaluated in each case and can then also be continuously updated if the measurement conditions such as, for example, the distance of the measuring device from the target, changes. The respective current measurement result of the distance measurement can then be transmitted to the user, for example via a display.

A user is therefore able to start a continuous length measurement with a single movement of the operating element.

It follows that the distance measuring device according to the disclosure permits simple and intuitive use. This also advantageously results in an intuitively accessible method for operating a distance measuring device, in particular a hand-held laser distance meter, in the case of which at least a first distance measurement is started, by means of a first operating element provided on the housing of the distance measuring device, in order to trigger a first distance measurement, in particular to trigger a sequence of distance measurements, in particular a sequence of continuous distance measurements, the first operating element advantageously being slid from a second position (B), in which the distance measuring device is switched off, into a first position (A), in particular being slid along the axis of measurement of the distance measurement.

In this case, the operating element can be arranged slideably substantially in the direction of the measurement signal. The operating element can then be slid in the direction of the measurement object and/or away from the measurement object, preferably parallel to the measurement direction. Here, "in the direction of the measurement signal" means along the axis of measurement, but in both directions, toward the target and also away from the target.

In particular, the first operating element can be slid along an axis of the housing of the distance measuring device.

In particular, the first operating element can be slid along the longitudinal axis of the distance measuring device.

In particular, for the purpose of triggering a distance measurement the operating element can be slid parallel to the longitudinal edges of the housing of the measuring device.

Thus, the operating element according to the disclosure of the distance meter can starts at least one distance measurement in a first position, in particular a first slide position. If the operating element designed as a slide or slide element is "pulled down", that is to say slid, for example in the direction of a user holding the device in his hand, that is to say is slid away from the target object toward the user, the measurement signal is switched on, and the measurement beam, for example in particular a laser beam serving for distance measurement, is emitted toward a target object and the distance measurement is started automatically. It is possible in this case not only to perform a distance measurement, but a sequence, in particular a continuous sequence of distance measurements is advantageously started.

In an advantageous embodiment, the distance measuring device according to the disclosure has a second operating element, for example a pressure and/or tactile operating element which enables a distance measurement, in particular a continuous, that is to say unbroken distance measurement, to be stopped and/or to be started again and/or to be visualized on a display of the device.

In this case, in accordance with the disclosure the second operating element need not be designed as a pressure and or tactile element, but can also assume other possible embodiments, for example also that of a slide switch.

The distance measurement triggered by actuation of the first operating element, designed as a slide switch, in particular such a continuous distance measurement, can be stopped, or "frozen", with the aid of the second operating element, in particular a pressure and/or tactile element. The second operating element therefore serves as a so-called "hold" key which holds an individual measured value by virtue of the fact that said value is visualized on the display and/or placed in a storage medium of the measuring device.

Thus, while the first operating element starts a distance measurement, or starts a sequence of distance measurements, the second operating element is used to select, that is to say "freeze" a special distance measurement from the sequence of the measurements.

Thus it is also possible according to the disclosure to provide that the second operating element stops a continuous, that is to say unbroken distance measurement, in particular stops a measurement signal from being emitted in the direction of a measurement object.

In an advantageous embodiment, the measuring device according to the disclosure has a second operating element, in particular a pressure operating element, which, depending on the position of the first operating element, designed as a slide element, enables a distance measurement, in particular a continuous, that is to say unbroken distance measurement, to be started and/or to be visualized on a display of the device.

Thus, for example, it is possible by renewed actuation of the second operating element, serving as "hold" key, to return the device into the continuous measurement mode. The previously "frozen" measured value can, for example, be stored in this case and/or visualized in the display of the device, while the continuous sequence of distance measurements is restarted.

It is advantageously rendered possible to switch off the distance measuring device using the first operating element, designed as a switch element, in a second position, in particular a second slide position.

In said second slide position, the first operating element, designed as a switch element, can cover the second operating element and thereby prevent it from being actuated.

An advantageous embodiment of the distance measuring device according to the disclosure results when, in one position of the first operating element, the second operating element is uncovered and/or covered by said operating element.

The operating concept according to the disclosure, or the operating elements according to the disclosure and their arrangement relative to one another therefore enable a very compact, intuitively accessible distance measuring device to be implemented whose operating elements are also used simultaneously as protector elements.

The distance measuring device according to the disclosure is preferably a hand-held distance measuring device. It is possible in this case to make use in particular of laser radiation, ultrasound or else radar radiation as measurement radiation.

It is particularly advantageous that the distance measuring device according to the disclosure is designed as a hand-held laser distance meter and, in particular, is designed in this case with a SPAD detector. The SPAD (Single Photon Avalanche Diode) detector can be integrated—if appropriate, including together with a reference detector—on an IC so that the entire electronics of the distance measuring device according to the disclosure can be of very compact design.

A very compact measuring device results in conjunction with the operating elements according to the disclosure and/or their at least temporarily overlapping arrangement.

BRIEF DESCRIPTION OF THE DRAWINGS

The Drawings illustrates exemplary embodiments of the disclosure, in particular of the distance measuring device according to the disclosure, which is explained in more detail in the following description. The person skilled in the art is aware that the features of individual exemplary embodiments may be combined at will with one another.

In the Drawings:

FIG. 4 shows a plan view of the distance measuring device according to the disclosure, in the switched-off (4a) and switched-on (4b) mode.

DETAILED DESCRIPTION

Figure 1:
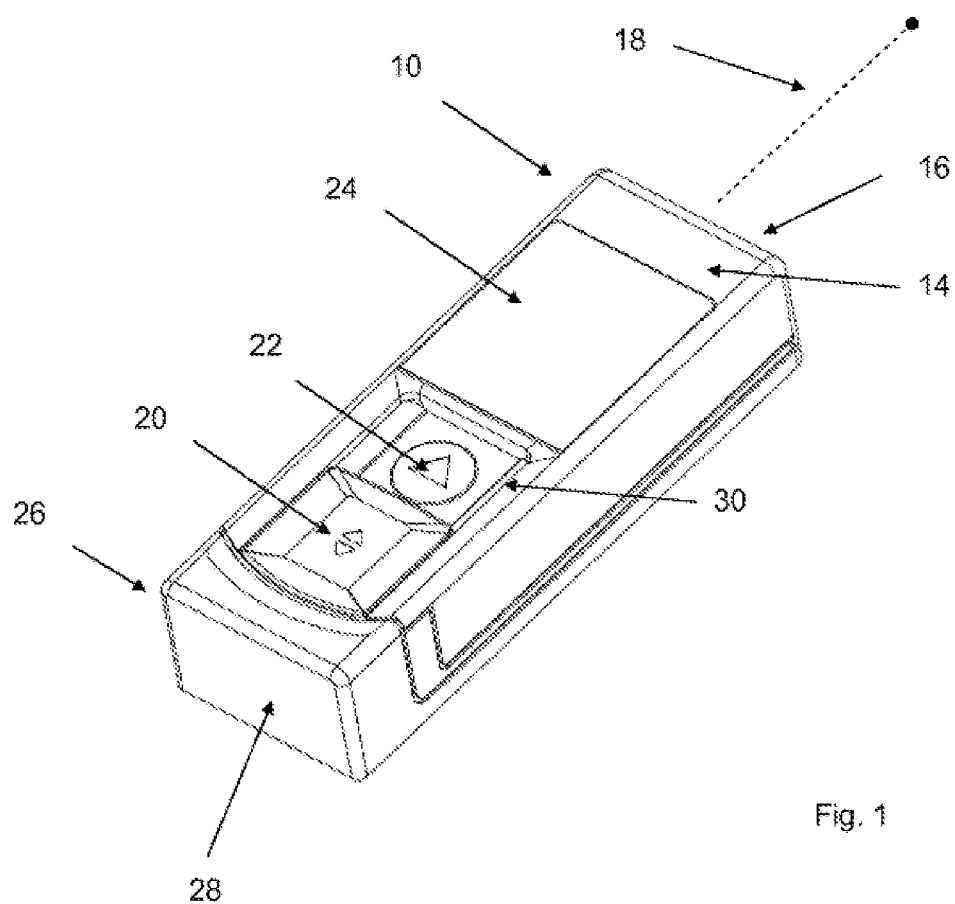
FIG. 1 shows a perspective illustration of a distance measuring device according to the disclosure.

The embodiment, illustrated in FIG. 1 in perspective view, of a distance measuring device 10 according to the disclosure shows a hand-held, very compact laser distance meter. The housing 12 of the embodiment in accordance with FIG. 1 is of substantially cuboid design and has slightly rounded edges and/or corners. The dimensions of said device housing 12 are in the range of 100 mm*26 mm*23 mm (length*width*height). On its top side 14, the device according to the disclosure has a display 24 which enables measurement results and other information items to be transmitted to a user. At its upper end 16, facing a target, the housing 12 has an outlet opening (not visible in FIG. 1) by means of which the measuring radiation 18 can leave the housing 12 of the measuring device in the direction of a target. Likewise, the housing 12 of the distance measuring device according to the disclosure has an inlet opening for the purpose of again coupling the measurement signal returning from the target into the device 10, and feeding it to detection and evaluation.

On the lower half, averted from the target, of the top side 14 of the housing 12, the exemplary embodiment, illustrated in FIG. 1, of a distance measuring device 10 according to the disclosure has two operating elements 20 and 22. The first operating element 20 is designed here according to the disclosure as a slide switch.

In the illustration of FIG. 1, the first operating element 20 is arranged in its first position (A).

The first operating element 20, designed as a slide switch, is advantageously slid in the direction of the axis of measurement of the measurement signal 18. In particular, for the purpose of triggering a distance measurement the operating element 20 is slid parallel to the longitudinal edges of the housing 12 of the measuring device 10. For this, the housing 12 of the distance measuring device has guide elements 30 which enable the first operating element 20 to be slideably arranged on the housing 12 of the measuring device 10. In particular, the first operating element 20 is slid in a plane, in particular a plane parallel to the surface of the device 14, that is to say without a vertical offset.

Of course, in alternative embodiments it is also possible in principle to slide the first operating element transverse to the axis of measurement of the measuring device, or such a slide could also be performed with a vertical offset.

A second operating element 22 of the distance measuring device according to the disclosure is arranged in a plane, in particular a parallel plane, below the sliding plane of the first operating element 20. The first operating element 20 is thus arranged with a relative vertical offset with regard to the second operating element 22 on the housing 12 of the distance measuring device 10. Said vertical offset between the two operating elements enables the first operating element 20 to be capable of sliding beyond the second operating element 22, and thus also of coming to lie above said second operating element 22 when the first operating element 20 is slid into its second slide position B in the direction of the target, or the front end 16 of the housing 12 of the measuring device 10. In said second position B of the first operating element 20, said element covers the second operating element 22, and therefore provides good protection against maloperations and knocking of the second operating element 22.

In the first slide position A, illustrated in FIG. 1, of the first operating element 20, the first operating element 20 switches on the measuring radiation 18. If the first operating element 20 is arranged in its first position A, the measuring radiation 18 is transmitted to a target to be measured, and it is detected by the measuring device 10 after reflection on said target. The detector integrated in the device can advantageously have at least one SPAD (Single Photon Avalanche Diode) detector. It is an avalanche diode operated in Geiger mode that is involved here. Such a SPAD detector can be integrated in an IC (Integrated Circuit), which leads to an additional reduction in the size of the distance measuring device according to the disclosure.

The distance between the distance measuring device 10 and a target under aim can be calculated by means of evaluation electronics (not illustrated in FIG. 1) located in the housing 12 of the measuring device 10, and be output on a display 24.

Figure 2:
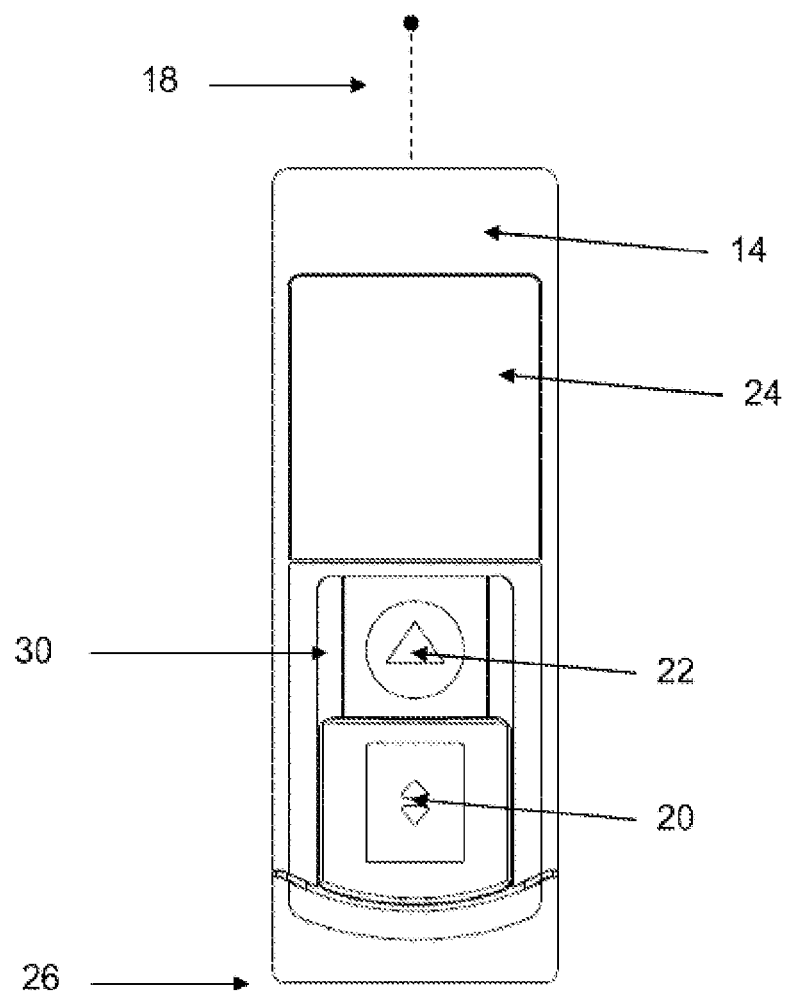
FIG. 2 shows the illustration of the distance measuring device according to the disclosure in accordance with FIG. 1, in plan view.

FIG. 2 shows the measuring device 10 from FIG. 1 in a plan view which further to a illustrates the arrangement of the display 24, a first 20 and second 22 operating element in said embodiment of the measuring device 10 according to the disclosure. Identical components are provided in this case with identical reference numerals.

Figure 3:
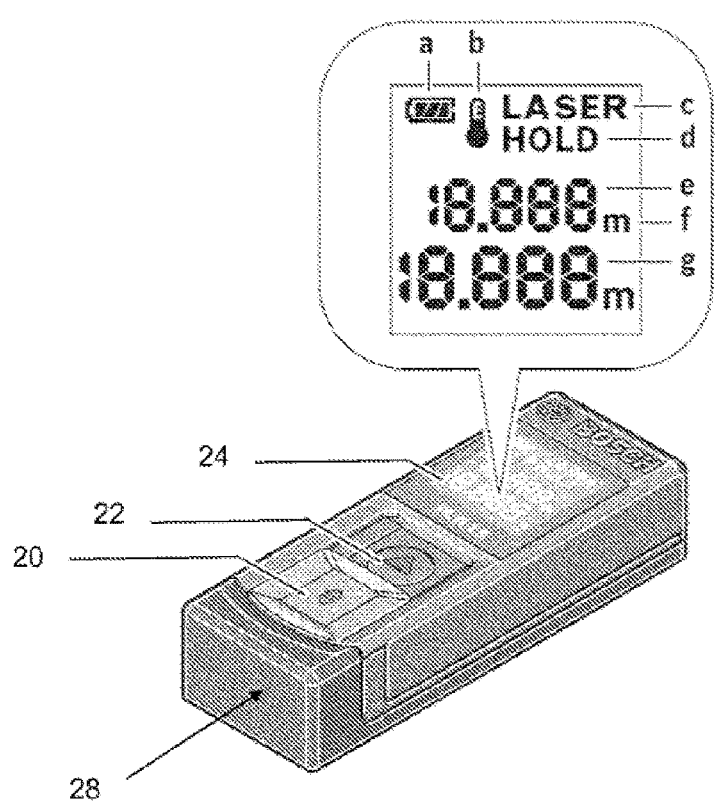
FIG. 3 shows a perspective illustration of a distance measuring device according to the disclosure, with a schematic illustration of the display.

The aim below is to provide a somewhat more detailed explanation of how the distance meter 10 according to the disclosure functions and is operated, doing so with the aid of FIGS. 3 and 4.

FIG. 4a shows a distance measuring device 10 according to the disclosure when switched off. The first operating element 20 is in its second position B facing the front end 16 of the housing 12 of the measuring device 10, and therefore simultaneously also covers the underlying second operating element 22.

In order to switch on the measuring device 10, the first operating element 20 that serves as on/off switch is slid rearward, that is to say away from the direction of the front end 16 of the housing 12 in the direction of the rear end 26 of the housing 12. Once the slide switch 20 is then in its first position A, the measuring device 10 is switched on. When the measuring device 10 has been switched on, a light source present in the measuring device, for example a laser diode, is switched on, in particular, so that the measurement signal 18 embodied as a laser beam in the exemplary embodiment is switched on. A display "LASER" can be reproduced in this case at a position/location c in the display 24 of the measuring device 10 by virtue of having this term "LASER" flicker, for example, (see also FIG. 3, in particular in this regard), in order to signal to a user that laser radiation is emerging from the device or that a measurement is active.

After the measuring instrument 10 has been switched on by sliding the first operating element 20, there is automatically a continuous measurement of the distance between the distance measuring device and to target. It is now possible, for example, to aim at the target surface or at a target with the visible laser beam of the measuring device. The distance from the measuring device to the target is determined via the measurement signal retroreflected into the measuring device, and output by means of the display 24 provided on the device. The current measured value is, in particular, displayed in the bottom line g of the display 24 (see FIG. 3 once more in this regard). During the continuous distance measurement started by the sliding of the first operating element, the measuring device can be moved relative to the target, the current measured value of the distance being updated in this case approximately every 0.5 seconds in the bottom line g of the display 24 where it is output. It is therefore possible, for example, to move away from a wall up to the desired distance from the wall; the current distance of the measuring device from the wall can always be read off in the display 24. The indication "LASER" flickers in the display 24 at the location c so as to signal to the user that the measurement signal is switched on and that distance measurements are currently being undertaken.

The reference plane for the distance measurement is the rear edge 26 of the measuring device 10 in this case. By way of example, the measuring device 10 is placed with its rear edge 26 against the output wall in order to measure from wall to wall. In alternative embodiments, it is also possible for other reference planes to be implemented, for example the front side 16 of the measuring device, or else a measurement stop associated with the device.

The second operating element 22 is pressed in order to stop a measuring process. The laser beam is switched off and the indication "HOLD" appears in the display 24 at the location/position d. The current measured value continues to be displayed in the bottom line g of the display 24, but is no longer continuously updated.

The laser is switched on again if the "HOLD" key, that is to say the second operating element 22, is pressed once more. The indication "LASER" flickers again in the display 24 at the location c. The preceding, "frozen" measured value is displayed in the top line e of the display 24. The continuously updated/current measured value is displayed in the bottom line g of the display 24.

If the "HOLD" key 22 is pressed once more, and if the measuring process is stopped again, the laser beam is switched off, and the indication "HOLD" appears in the display 24 at the location/position d. The preceding measured value is indicated in the top line e of the display 24. The current measured value is displayed in the bottom line g, but is no longer continuously updated.

If no operating element on the measuring instrument is actuated for approximately 5 min, the measuring device 10 is switched off automatically to save the batteries.

If a measured value was held via the "HOLD" function, it is retained for an automatic shutdown. After the measuring instrument has been switched on again by pressing the "HOLD" key 22, the preceding measured value is displayed in the top line e of the display 24. The batteries can be conventional disposable cells, or else rechargeable battery cells. In the latter case, the batteries can be permanently integrated in the housing of the measuring device and are recharged via an interface such as, for example, a USB, in particular a mini USB.

After having been switched off automatically, the device can be reactivated by sliding the first operating element 20.

In order for a user to switch off the measuring instrument consciously, the first operating element 20, which forms the on/off switch of the measuring device 10, is slid forward, that is to say in the direction of the front end 16, thereby coming to lie above the second operating element 22 in the position B and thereby once again covering said second operating element.

The invention claimed is:
1. A distance measuring device, comprising:
a housing;
a transmitting unit, arranged in the housing and configured to emit a measuring radiation in a direction of a measurement object;
a receiving unit configured to receive measuring radiation returning from the measurement object; and
a first operating element configured to trigger at least one distance measurement, the first operating element including a slide element, and
further comprising:
a display; and
a second operating element configured to at least one of:
stop a distance measurement;
initiate a distance measurement; and
cause a distance measurement to be visualized on the display, and wherein the first operating element is configured to cover the second operating element when in at least one position.

2. The distance measuring device as claimed in claim 1, wherein the first operating element is arranged slideably on or in the housing.

3. The distance measuring device as claimed in claim 1, wherein the first operating element is configured to slide along a direction of the measurement signal.

4. The distance measuring device as claimed in claim 1, wherein the first operating element is configured to initiate at least one distance measurement when in a first position.

5. The distance measuring device as claimed in claim 1, wherein the first operating element is configured to initiate a continuous distance measurement when in a first position.

6. The distance measuring device as claimed in claim 1, wherein the first operating element is configured to switch off the device when in a second position.

7. The distance measuring device as claimed in claim 1, wherein the second operating element is configured to stop a continuous distance measurement by stopping the measurement signal from being emitted in the direction of a measurement object.

8. The distance measuring device as claimed in claim 1, wherein the housing of the device has a length in the measurement direction of less than 150 mm.

9. The distance measuring device as claimed in claim 1, wherein the housing of the device has a width of less than 40 mm transverse to the measurement direction.

10. The distance measuring device as claimed in claim 1, wherein the housing of the device has a height of less than 30 mm perpendicular to the measurement direction and perpendicular to a width of the device.

11. The distance meter as claimed in claim 1, wherein the housing includes at least one SPAD detector.

12. A method for operating a distance measuring device, comprising:
  initiating at least a first distance measurement, the initiating including:
    sliding a first operating element arranged on a housing of the distance measuring device, along an axis of measurement of the distance measuring device from a second position to a first position,
    wherein the distance measuring device is configured to be switched off when the first operating element is in the second position,
    wherein the first operating element is configured to trigger at least a first distance measurement when slid from the second position to the first position,
    wherein the distance measuring device further includes:
      a display; and
      a second operating element configured to at least one of:
        stop a distance measurement;
        initiate a distance measurement; and
        cause a distance measurement to be visualized on the display, and
  wherein the first operating element is configured to cover the second operating element when in at least one position.

* * * * *